R. E. HELLMUND.
CONTROL SYSTEM.
APPLICATION FILED NOV. 7, 1917.
1,291,508.
Patented Jan. 14, 1919.
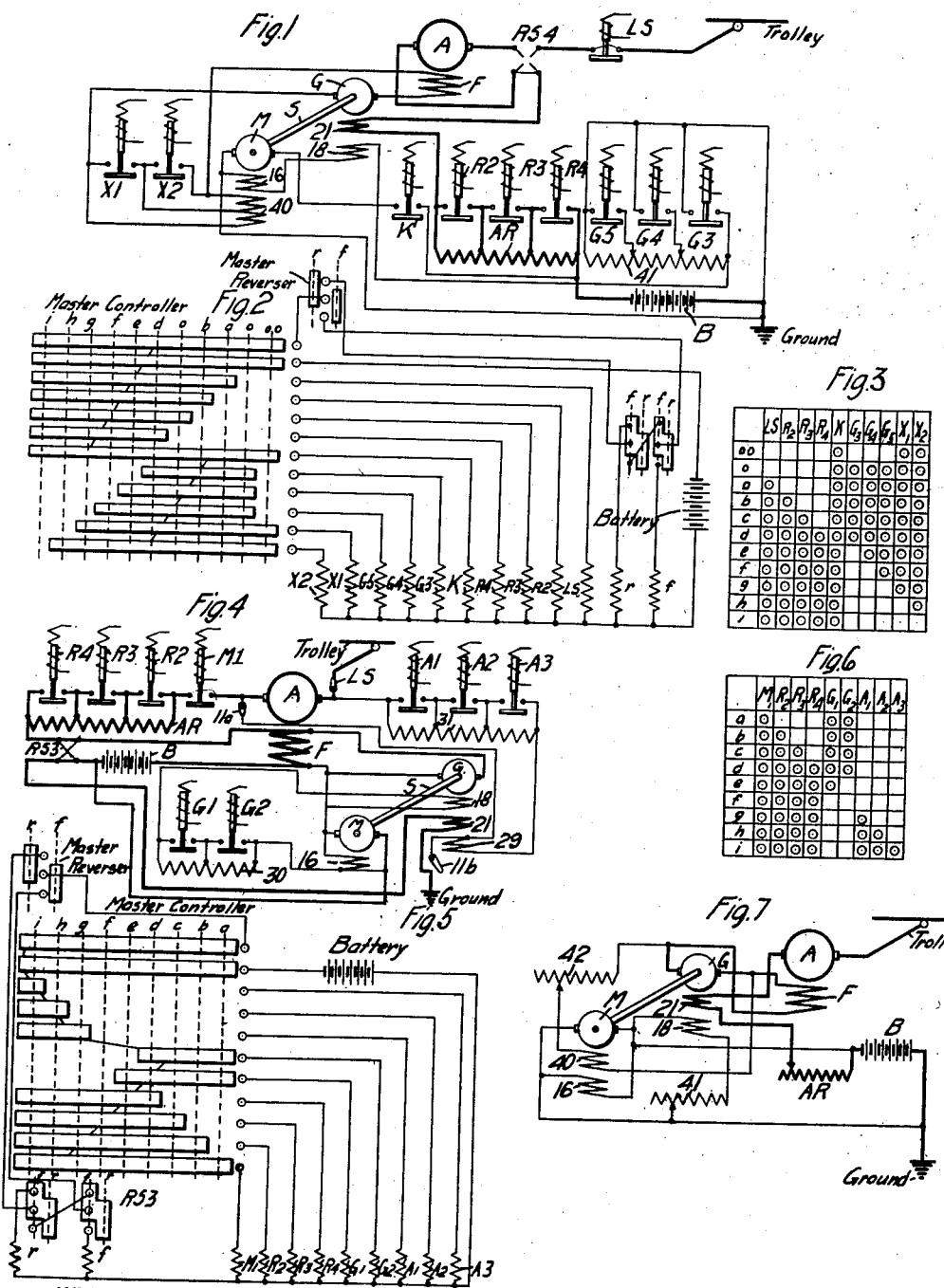
WITNESSES:
INVENTOR
Rudolf E. Hellmund
BY
ATTORNEY

UNITED STATES PATENT OFFICE.

RUDOLF E. HELLMUND, OF SWISSVALE, PENNSYLVANIA, ASSIGNOR TO WESTINGHOUSE ELECTRIC AND MANUFACTURING COMPANY, A CORPORATION OF PENNSYLVANIA.

CONTROL SYSTEM.

1,291,508.      Specification of Letters Patent.      Patented Jan. 14, 1919.

Original application filed September 25, 1914, Serial No. 863,504. Divided and this application filed November 7, 1917. Serial No. 200,856.

*To all whom it may concern:*

Be it known that I, RUDOLF E. HELLMUND, a citizen of the German Empire, and a resident of Swissvale, in the county of Allegheny and State of Pennsylvania, have invented a new and useful Improvement in Control Systems, of which the following is a specification, this application being a division of my copending application, Serial No. 863,504, filed September 25, 1914, patented December 11, 1917, Patent No. 1,249,954.

My invention relates to systems of control, and it has special reference to means for preventing the occurrence of "flash-over" conditions in dynamo-electric machines, more particularly electric railway motors, under predetermined conditions.

One object of my invention is to provide simple and reliable means of the above-indicated character which shall effectively obviate the possibility of "flash-over" of electric motors upon the resumption of supply-circuit voltage after a temporary interruption thereof, such as is caused by the trolley wheel or other current-collecting member passing under a section break or otherwise momentarily leaving the supply-circuit conductor.

More particularly, in high-voltage direct current systems and in the case of locomotives of large capacity, it may be advisable, for economical and other reasons, to provide means for preventing "flash-over" of the motor, the most common cause of which is the sudden resumption of supply-circuit energy after the temporary interruption thereof at section breaks, etc. Whenever the supply of energy is resumed, a heavy rush of current through the deënergized motor windings occurs, which causes great field-flux distortion and relatively high voltage between commutator segments. This condition arises by reason of the fact that the flux set up by the armature current, upon resumption of supply-circuit energy, readily traverses the entirely laminated armature core, and, consequently, builds up to a normal value much more rapidly than the main field flux which encounters the high magnetic reluctance of the solid iron or steel frame castings and which is, therefore, partly damped out by eddy currents.

According to my present invention, I provide various modifications of means for obviating the above-mentioned operating difficulties by energizing a part or all of the main field windings from some auxiliary source of energy when the supply-circuit energy is temporarily interrupted. The main field flux is thus maintained at a predetermined value during the interruption and, as a result, when the supply-circuit energy is resumed, the predominance of armature ampere-turns over field ampere-turns is prevented, and "flash-over" conditions do not obtain.

In the accompanying drawings, Figure 1 is a diagrammatic view of the main circuits of a system of control embodying the invention; Fig. 2 is a diagrammatic view of an auxiliary control system for governing the main-circuit connections of Fig. 1, in accordance with the sequence chart of well-known form that is shown in Fig. 3; Fig. 4, Fig. 5 and Fig. 6 are views, respectively corresponding to Fig. 1, Fig. 2 and Fig. 3, of a modified form of the invention; and Fig. 7 is a diagrammatic view of another modification thereof.

Referring to Fig. 1 of the drawing, the system shown comprises a supply-circuit conductor marked "Trolley", a return circuit conductor marked "Ground", an electric motor having an armature A and a field magnet winding F of the series type; an auxiliary motor-generator set comprising a motor M that is driven from a battery B in the main circuit, and a generator G that is connected to energize the main field winding F; an accelerating resistor AR, the sections of which are respectively adapted to be short-circuited by switches R2, R3 and R4, which are preferably of a familiar electromagnetically actuated type; a line switch LS and an auxiliary motor-circuit switch K of similar form; and a reversing switch RS4 for reversing the electrical relations of the main armature and field winding.

The auxiliary motor M is provided with a shunt field winding 16, and a second field winding 40 that is connected in series-circuit relation with the main field winding F, and the sections of which are respectively adapted to be short-circuited by switches X1 and X2. The generator G is provided with a shunt field winding 18 that is connected in series with a resistor 41, the sections of which are respectively adapted to be short-circuited by switches G3, G4 and G5, across the battery B, and with a series field winding 21 that is connected in series-circuit relation with the main motor.

The auxiliary control system, of a familiar type, that is illustrated in Fig. 2, is adapted to actuate the various switches embodied in the system shown in Fig. 1 in accordance with the sequence chart of Fig. 3. Inasmuch as the particular means for manipulating the main-circuit connections is not relevant to my invention, no detailed description thereof is deemed necessary.

The accelerating operation of the system shown in Fig. 1 may be briefly set forth as follows: Upon initial connection to the supply circuit, the switches LS and K are closed, and the motor field winding 40 and the generator field resistor 41 are completely short-circuited. The sections of the accelerating resistor are then successively short-circuited by the closure of the switches R2, R3 and R4, to gradually effect an increased main motor speed. The several field-controlling switches G3, G4 and G5, and X1 and X2 are opened in that order to respectively effect a weakening of the generator-field flux and a strengthening of the auxiliary motor-field flux with its consequent motor-speed reduction, to thereby gradually decrease the excitation of the main field winding F, and thus increase the main motor speed. Inasmuch as the auxiliary motor field winding 40 is connected in series-circuit relation with the main field winding F, the direction of current traversing which is the same for a given direction of rotation, the auxiliary motor field winding 40 will never have a negative effect upon the field flux of the small Motor M.

Since the battery B is connected in the main circuit, as previously mentioned, it follows that a certain amount of energy is derived from the machine circuits by the charging of the battery and is thus stored on the vehicle. Such stored energy is available for subsequent use, upon the interruption of supply-circuit energy, in the manner about to be set forth. This feature is characteristic of all the illustrated forms of my invention.

In case of an interruption of supply-circuit energy, the generator voltage will decrease by reason of the deënergization of its series field winding 21, thus effecting a certain decrease in the excitation of the main field winding F; however, this condition will be counterbalanced to some extent because the reduced current in the auxiliary motor field winding 40 will tend to increase the speed of the motor-generator set, and thus again increase the main motor field excitation, and maintain a predetermined value thereof during the energy interruption.

Fig. 4 illustrates a system comprising a suitable supply circuit; the main motor 70 having the armature A and the field winding F; the battery B which is connected in circuit with the motor; the auxiliary motor-generator set having a motor M that is driven from the battery B and a generator G that is adapted to energize the main field winding F; a reversing switch RS3 for the armature A with respect to the field winding F and the motor-generator set and battery; an accelerating resistor AR, the sections of which are adapted to be respectively short-circuited by switches R2, R3 and R4; and a plurality of main-circuit switches LS and M1.

The motor M is provided with a shunt field winding 16, while the generator G is provided with three field windings 18, 21 and 29. The shunt field winding 18 is connected in series with a resistor 30, the sections of which are respectively adapted to be short-circuited by switches G1 and G2; the series field winding 21 is connected in series-circuit relation with the main motor; and the field winding 29 is adapted to act differentially to the other two and is connected across the main armature A in series with a resistor 31, the sections of which are respectively adapted to be short-circuited by switches A1, A2 and A3. All of the switches shown, with the exception of the switch LS, are preferably of a simple and familiar electromagnetically operated type, the actuating coils of which are adapted to be energized by the auxiliary control system shown in Fig. 5, in accordance with the sequence chart of Fig 6.

The acceleration of the motor may be effected by initially closing switches LS, M1, G1 and G2, then gradually and successively closing the resistor-short-circuiting switches R2, R3 and R4; further acceleration may be secured by successively opening switches G1 and G2 to weaken the shunt field winding 18, and closing switches A1, A2 and A3 to strengthen the armature-excited, differentially-connected field winding 29, thereby in each case serving to further weaken the current in the main field winding F to increase the main motor speed. The auxiliary control system illustrated in Fig. 5 is of a simple and familiar type that is adapted to actuate the several circuit switches as just described and, as indicated in the chart of Fig. 6, and, inasmuch as the particular system employed for arranging the circuit connections of the system shown in Fig. 5 is not material to my present invention, I have not deemed it necessary to describe the auxiliary control system in detail.

Assuming the motor to be running in its final operating condition, and that the actions of the generator field windings 18 and 29 are then exactly equal and opposite, so that the field winding 21 is alone active, the operation of the system with respect to the prevention of "flash-over" conditions may be described as follows: By reason of the neutralization of the generator field windings 18 and 29, the main motor will run with a straight series speed characteristic. Upon the interruption of supply-circuit energy, the main motor field excitation and the main armature voltage tend to decrease to zero. Consequently, the excitation of the armature-excited field winding 29 decreases, with the result that the shunt field winding 18 exerts an active influence to produce a positive magnetization of the generator G, and, therefore, of the main field winding F to a predetermined extent which will obviate an excessive rush of current when the supply-circuit energy is resumed.

The system shown has the further advantage of producing relatively steep speed characteristic curves, during acceleration. Since the generator field winding 29 is excited from the main armature A, the voltage impressed upon the field winding will increase as the main-circuit resistor is gradually short-circuited, thereby effecting an automatic decrease of the current supplied by the generator G to the main field winding F as the main motor accelerates, by reason of the differential action of the field winding 29. It will be understood that relatively steep accelerating characteristic curves signify a relatively small number of requisite accelerating positions of a motor-controller. As a modification of the system, the generator field winding 29 may be connected across the supply circuit, by opening a switch 11$^a$ and closing a switch 11$^b$, in which case, the type of characteristic curves referred to would not, of course, be obtained.

Fig. 7 illustrates, by a simplified diagram, a system which differs from that shown in Fig. 1 only in that the field winding 40 of the auxiliary motor is connected in series with a variable resistor 42 across the main field winding F, instead of in series therewith, as in the system of Fig. 1. The operation of the system will be readily understood from the discussion given in accordance with Fig. 1.

If desired, instead of exciting the generator shunt field winding 18 from the battery B, it may be energized from the main armature A. While the speed characteristic of the main motor will then be somewhat different, the operation of the system relative to temporary supply-circuit interruptions will be similar to that already set forth.

I do not wish to be restricted to the specific circuit connections or arrangement of parts herein set forth, as various further modifications may be made within the spirit and scope of my invention. I desire, therefore, that only such limitations shall be imposed as are indicated in the appended claims.

I claim as my invention:

1. In a system of vehicle control, the combination with a supply circuit, and a dynamo-electric machine having an armature and a field winding, of series-connected means for deriving energy from the circuits of said machine during normal operation thereof from said supply circuit and for storing such energy on the vehicle, and means dependent upon an interruption of supply-circuit energy for utilizing such stored energy to energize the field winding.

2. In a system of vehicle control, the combination with a supply circuit, and a dynamo-electric machine having an armature and a field winding, of means for deriving energy from the circuits of said machine during normal operation thereof from said supply circuit and for electrically storing such energy on the vehicle, and means dependent upon an interruption of supply-circuit energy for utilizing such stored energy to effect excitation of said field winding.

3. In a system of control, the combination with a supply circuit, and a dynamo-electric machine having an armature and a field winding, of a storage battery connected to derive energy from the circuits of said machine during normal operation thereof from said supply circuit, and means dependent upon an interruption of supply-circuit energy for utilizing said battery to effect excitation of said field winding by such derived energy.

4. In a system of control, the combination with a supply circuit, and a main dynamo-electric machine having an armature and a field winding, of an auxiliary generator for exciting said field winding, a driving motor for said generator, and a storage battery connected to said driving motor and also connected to derive energy from the circuits of said main machine during normal operation thereof from said supply circuit, whereby, upon an interruption of supply-circuit energy, said battery alone effects the operation of the auxiliary machines to maintain the excitation of the main field winding.

5. In a system of control, the combination with a supply circuit, and a main dynamo-electric machine having an armature and a field winding, of an auxiliary generator armature for exciting said field winding, a driving motor armature for said generator armature, a storage battery connected to said driving motor armature and also connected to derive energy from the circuits of said main machine during normal operation thereof from said supply circuit, a plurality of field windings for said generator armature respectively energized by the main-armature current and from said battery, and a plurality of field windings for said driving motor armature respectively energized by the main-field-winding current and from said battery.

6. In a system of vehicle control, the combination with a supply circuit, and a dynamo-electric machine having an armature and a field winding, of means connected in series relation with said armature for deriving energy from the circuits of said machine during certain operation thereof from said supply circuit and for storing such energy on the vehicle, and means dependent upon a certain change of supply-circuit conditions for utilizing such stored energy to energize the field winding.

7. In a system of vehicle control, the combination with a supply circuit, and a dynamo-electric machine having an armature and a field winding, of means connected to derive energy from the circuits of said machine during operation thereof from said supply circuit, and means dependent upon a certain change in machine-load conditions for utilizing said energy-deriving means to effect excitation of said field winding.

In testimony whereof, I have hereunto subscribed my name this 24th day of Oct. 1917.

RUDOLF E. HELLMUND.